May 22, 1956 G. B. HERZOG 2,747,136

CATHODE RAY BEAM DEFLECTION SYSTEM

Filed March 1, 1954

INVENTOR.
Gerald B. Herzog

BY [signature]

ATTORNEY 2,747,136
Patented May 22, 1956

2,747,136

CATHODE RAY BEAM DEFLECTION SYSTEM

Gerald B. Herzog, Princeton, N. J., assignor to Radio Corporation of America, a corporation of Delaware Application March 1, 1954, Serial No. 413,063
11 Claims. (Cl. 315—27)

The present invention relates to improvements in cathode ray beam deflection systems and more particularly, although not necessarily exclusively, to television type deflection systems in which sawtooth signal waveforms are employed.

More directly, the present invention relates to improvements in cathode ray beam deflection systems in which a relaxation type oscillator circuit, or equivalent, is used as a source of sawtooth deflection signal, which is, in turn, to be coupled directly to a deflection signal power amplifier stage, adapted for excitation of electromagnetic deflection coils.

The present invention further relates to improved cathode ray beam deflection circuits in which transistor power amplifier devices are used for excitation of electromagnetic deflection means.

Many systems and circuit arrangements may be found in the prior art for producing electron beam deflection in cathode ray beam devices. In the more refined deflection systems, it is common practice to provide first a source of deflection signal waveform, and second, signal amplifying means which directly drives the cathode ray beam deflection means. In this way, the characteristics of the deflection signal waveform may be fashioned and determined independently of the electrical characteristics of the cathode ray beam deflection means, per se.

In electromagnetic deflection systems of the type commonly found in television picture reproducing systems, it has been quite popular to provide a relaxation type oscillator which periodically discharges what is referred to as a sawtooth forming capacitor. A sawtooth forming capacitor is an electrical capacitor connected in charging relation to a relatively high impedance source of charging voltage. The effective resistance of the charging voltage source taken in combination with the value of the capacitor determines the rise time and, in most cases, the period of the developed sawtooth waveform. A relaxation type oscillator circuit connected in shunt with the capacitor provides means for periodically discharging the capacitor so as to form a recurrent sawtooth waveform across the capacitor. The relaxation oscillator means may be a gaseous discharge device, a thermionic electron emission device, a semiconductor amplifier device, etc. In general, the operation of the relaxation oscillator is the frequency determining means for the resulting sawtooth signal. In television deflection systems it is important to stabilized picture reproduction that the relaxation oscillator means itself be stable in operation.

It has been found that most efforts to directly couple electromagnetic deflection means, such as a cathode ray deflection yoke, to a relaxation oscillator means results not only in low circuit efficiency but poor waveform and circuit instability. By imposing a thermionic vacuum tube amplifier between the relaxation oscillator sawtooth waveform generating means, and for example, a deflection yoke, much improvement in circuit operation and performance can be realized. Not only are power amplifier tubes suitable for driving cathode ray beam deflection yoke windings at high signal levels quite expensive but interelectrode capacitance between the elements of the thermionic amplifier sometimes permits unwanted coupling between the deflection yoke and the relaxation oscillator sawtooth waveform producing means. This unwanted coupling may produce waveform distortion or it may provide errors in the timing of the relaxation oscillator due to feedback thereto of stray deflection circuit synchronizing and deflection waveform components undesirably appearing on the deflection yoke windings being driven by the thermionic amplifier. Certain advantages in overcoming these deficiencies may be realized by applying low impedance semiconductor signal transducing devices in driving the deflection yoke. However, heretofore, the circuit means for driving said semiconductor signal transducing amplifiers as well as the power efficiency of such amplifiers, has discouraged their general application in home type television receivers.

It is, therefore, an object of the present invention to provide an improved electron beam deflection circuit for cathode ray beam devices.

It is another object of the present invention to provide an improved cathode ray beam deflection system, particularly of the type embodying a relaxation oscillator deflection signal generating means, so that characteristics of the deflection signal utilizing means has substantially no influence on the operating mode of the relaxation oscillator means.

Yet another object of the present invention is to provide an improved cathode ray beam deflection system of a type permitting the effective employment of semiconductor signal transducing amplifier devices such as, for example, the transistor.

It is still another object of the present invention to provide an improved means embodying one or more semiconductor signal transducing devices for exciting electromagnetic cathods ray beam deflection coils as employed in television scanning apparatus.

Another object of the present invention resides in the provision of a novel electromagnetic cathode ray beam deflection system embodying semiconductor signal transducing amplifying devices and eminently suited for use in home instrument type television signal receiving and reproducing apparatus.

In the realization of the above objects and features of advantage, it is contemplated in the practice of the present invention, to include a low impedance input control circuit of a semiconductor signal transducing amplifier device in series with either the charge or discharge path of a capacitor in turn connected for development of a sawtooth deflection signal. By providing direct current coupling between an output electrode of said semiconductor signal transducing device and the windings of an electromagnetic deflection yoke, the current in the deflection yoke winding may be efficiently controlled to provide linear saw-tooth current excitation thereof for both horizontal and vertical television deflection circuits.

A better understanding of the present invention, as well as an appreciation of other objects and features of advantage thereof, will be obtained from a reading of the following specification, especially when taken in connection with the accompanying drawings, in which.

Figure 1:
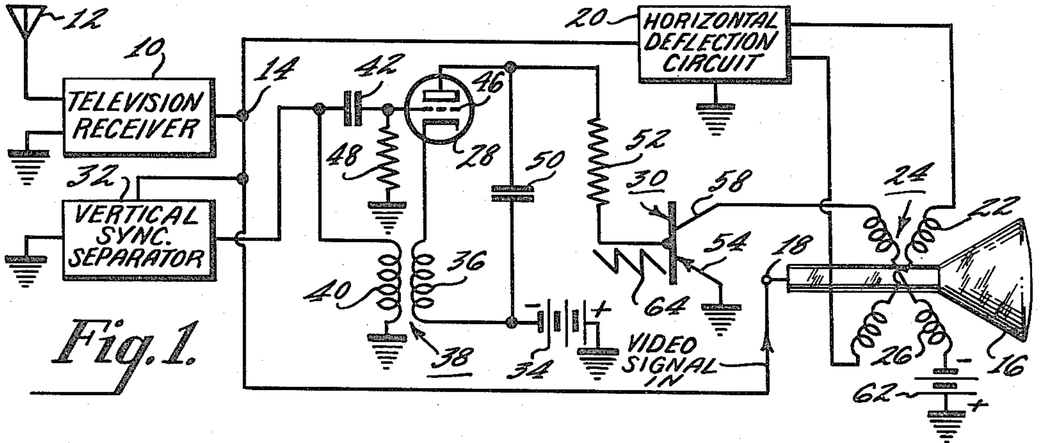
Figure 1 is a combination block and schematic representation of one form of cathode ray beam deflection circuit embodying the novel features of the present invention and in which both a vacuum tube and semiconductor signal transducing device are employed.

Turning now to Figure 1, there is shown the basic components of a television receiving system, including a television signal receiving means 10, adapted to transduce radio signals received at the antenna 12 and convert them into demodulated video signals in a manner well known in the television art. Video signals appearing at the output terminal 14 are communicated to a control electrode on the kinescope 16, the control electrode being shown to have a terminal at 18. Demodulated video signal is also applied to a horizontal deflection circuit 20, adapted to deliver horizontal deflection current to the deflection winding 22 of the deflection yoke 24. The deflection yoke 24 is physically positioned about the neck of the kinescope 16 in a conventional fashion.

In accordance with the present invention, vertical deflection signal current for the vertical deflection winding 26 of the deflection yoke 24 is shown as provided by a combination circuit embodying a vacuum tube 28 and semiconductor signal transducing device 30. The semiconductor signal transducing device 30 may be typically a germanium type P-N-P junction transistor, and will purely, by way of example, be so considered in the following description of this particular embodiment of the present invention. The vacuum tube 28 is basically connected in a novel variation of the well known cathode feedback relaxation oscillator adapted for synchronization by television vertical sync pulses appearing at the output terminal of the vertical sync separator circuit 32. The vertical sync separator circuit 32 is in turn supplied with video signal derived from the television receiver 10.

The relaxation oscillator involving tube 28 comprises a source of polarizing potential 34 having its positive terminal connected with circuit ground. The negative terminal of the power supply 34 is connected through the primary winding 36 of feedback transformer 38. The secondary winding 40 of the feedback transformer is connected between circuit ground and the left hand terminal of blocking capacitor 42. The right hand terminal of the capacitor 42 is, in a conventional fashion, connected with control electrode 46, which is in turn coupled with circuit ground through the grid leak resistor 48. A sawtooth charging capacitor 50 is connected between the anode of the tube 28 and the negative terminal of the polarizing potential source 34. The upper terminal of the sawtooth charging capacitor 50 is connected through the time constant resistor 52 to circuit ground through the base emitter path of the transistor 30. Due to the fact that the emitter 54 of the transistor 30 is connected with circuit ground, it is seen that the capacitor 50 is placed in charging relation with the polarizing potential source 34 through the emitter base path of the transistor 30. The vertical deflection yoke winding 26 is then connected between the collector electrode 58 of the transistor 30 and the negative terminal 60 of a polarizing potential source 62. In practice, the polarizing source 62 may include the polarizing source 34.

In the operation of the circuit shown in Figure 1, the relaxation oscillator involving tube 28 will cause periodic discharging of the capacitor 50 during intervals corresponding to conduction in the tube 28. As is well known in relaxation oscillator operation, conduction in tube 28 causes a positive going pulse to appear at the upper terminal of the transformer secondary winding 40. The grid current produced by this pulse produces a negative cutoff bias on the control electrode 46 which is stored by the capacitor 42. As the charge of the capacitor 42 leaks off through grid leak resistor 48, and the internal resistance of the sync separator 32, the capacitor 50 is charging from the source 34 through resistor 52 and the emitter base path of transistor 30. Thus, the anode of tube 28 assumes more positive potential with respect to its cathode, as the negative cutoff bias on the tube 42 is reduced. Eventually, the anode voltage of tube 42 will reach a value which, when taken in connection with the then existing grid bias, will permit conduction in the tube 28. This results, as before, in discharging of the capacitor 50 and the recharging of capacitor 42 to hold tube 28 in a cutoff condition at the next cycle.

In accordance with the present invention, advantage is taken of the fact that the current applied to the sawtooth charging capacitor 50 during periods of non-conduction in tube 28 linearly decreases in value up to the time when conduction in the tube 28 discharges the capacitor 50. Thus, the waveform of current through the emitter base path of the transistor 30 may appear somewhat as shown by the waveform 64. Due to the power amplifying capabilities of the transistor (when the emitter is biased forwardly and the collector biased in a reverse direction) a sawtooth of current will be produced in the deflection coil 26 suitable for vertical deflection of the cathode ray beam within the kinescope 16. Due to the relatively low base input impedance of the transistor 30, which comprises a very small part of the total charging resistance for the capacitor 50, variations in the characteristics of the deflection yoke 24, as well as in the potential applied to the collector 58 of the transistor 30 will have little effect upon the operation of the relaxation oscillator 28. Likewise, due to the fact that the resistor 52, taken in combination with the capacitor 50, forms an effective integrating network or low-pass filter, unwanted high frequency signal components capacitively or inductively caused to appear across the vertical deflection winding 26 will be so highly attenuated at the anode of tube 42 that they cannot interfere with relaxation circuit operation.

Figures 2, 3:
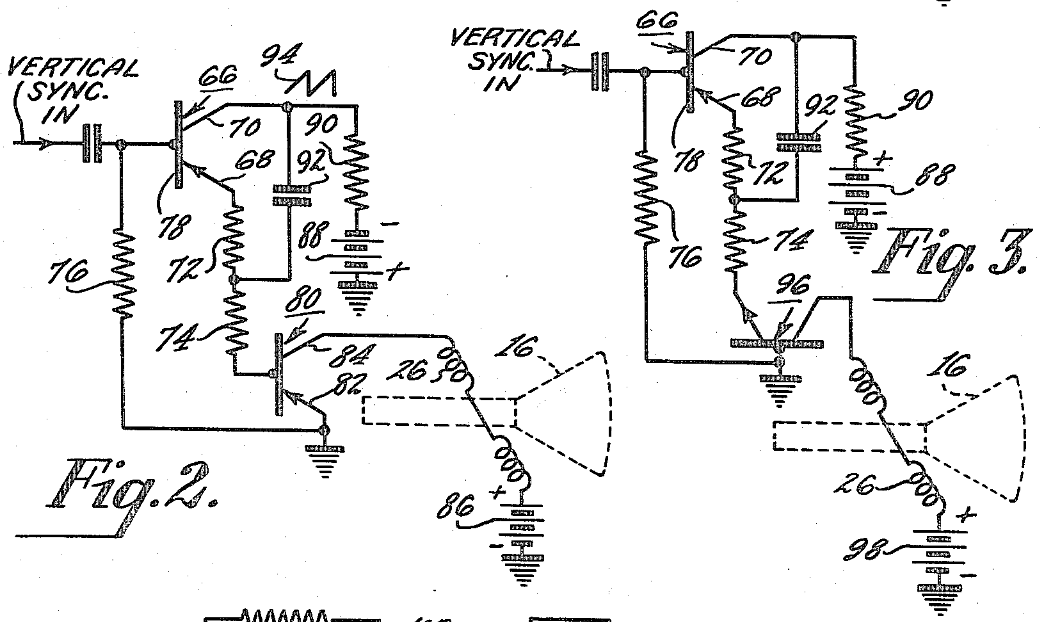
Figure 2 is a schematic representation of another form of cathode ray beam deflection system embodying the novel features of the present invention, and in which only semiconductor signal transducing devices are employed.
Figure 3 is a schematic representation of still another form of cathode ray beam deflection system, embodying the novel features of the present invention, and in which only semiconductor signal transducing devices are employed.

The embodiment of the invention shown in Figure 2 is substantially the same as that shown in Figure 1, except that the relaxation oscillator involving tube 28 has been replaced by a transistor type relaxation oscillator. This oscillator comprises a transistor 66, preferably of the point contact variety, having an emitter electrode 68 and collector electrode 70. The emitter electrode 68 is connected through resistor 72, resistor 74 and resistor 76 to the base electrode 78 of the transistor. As is shown, the emitter base path including these resistors, also includes the base emitter path of another transistor 80. The transistor 80 corresponds in every respect to transistor 30 shown in Figure 1 and is also illustrated as being of the P-N-P type. The emitter 82 of transistor 80 is connected with circuit ground while the collector 84 thereof is connected with the vertical deflection winding 26, whose lower extremity is connected with a collector polarizing source 86, the latter corresponding to the source 62 shown in Figure 1. Collector voltage for the transistor 66 is provided by the polarizing potential source 88 through resistor 90. Resistor 90 acts in conjunction with the sawtooth charging capacitor 92 to define the frequency of relaxation oscillator operation. Capacitor 92 is also seen to be connected in shunt with the emitter collector path of transistor 66 so that upon emitter collector conduction within the transistor, the capacitor 92 may be rather quickly discharged.

For purposes of illustrational convenience, certain circuit components, comprising the overall television receiving system shown in Figure 1, have been omitted in Figure 2. In the operation of Figure 2 separated vertical sync signal is applied to the base electrode 78 of transistor 66. The manner in which the transistor 66 acts in conjunction with the sawtooth charging capacitor 92 to provide generation of the sawtooth voltage waveform 94 at the upper terminal of resistor 90 is shown and described in U. S. Patent No. 2,731,567, entitled "Transistor Relaxation Oscillator," issued January 17, 1956 to George Clifford Sziklai. Further basic principles of operation are described in the U. S. Patent to Everett Eberhard, No. 2,533,001, issued December 5, 1950, entitled "Flip-Flop Counter Circuit."

Basically, the charging current of the capacitor 92 (charging from the source 88) causes a voltage drop to appear across resistor 74 in such a direction as to reduce forward bias applied to the transistor emitter 68. As the capacitor 92 charges more fully, the charging current through resistor 74 decreases and the forward bias on the emitter 68 becomes greater to a point, causing the point contact transistor to enter into a negative resistance current amplifying portion of its characteristic. Under these conditions a regenerative discharging action of the capacitor 92 will take place in which an increase in forward bias current through the emitter 68 will be effectively seen as a correspondingly much greater increase in collector current through the collector electrode 70. Capacitor 92 will in effect then be rapidly discharged by means of a very low effective emitter collector resistance in the transistor 66 during regeneration. At the termination of the capacitor discharge action which drives the transistor 66 to the extent of its operating characteristic, recharging of the capacitor 92 will occur through the resistor 90 and resistor 74. Regenerative discharge of the capacitor will not then occur until sufficient collector voltage is provided concomitantly with the reduction in charging current through the resistor 74 as before described.

In accordance with the present invention, the emitter base path of the transistor 80 is included in only the charging path of the capacitor 92. Thus, the substantially linearly decreasing charging current for the capacitor 92 will act as a control current for the transistor 80, whereby to provide a collector output current through the vertical deflection winding 26 which is sawtooth in waveform. Triggering of the overall deflection circuit may, of course, be accomplished by applying negative going sync to the base electrode 78 or positive going sync to the emitter 68 of transistor 66. Due to low impedance characteristics of the transistor 80 and the novel manner in which it is connected to respond only to the charging current of the capacitor 92, overall operation of the relaxation oscillator will be rendered substantially independent of the characteristics of all voltages appearing across the deflection coil 26.

An alternative form of the circuit arrangement shown in Figure 2 is also shown in Figure 3, wherein the transistor 80 of Figure 2 shown to be of the P—N—P type, is replaced in Figure 3 by transistor 96 of the N—P—N type. To accomplish this, the base input arrangement for the transistor shown for Figure 2 has been changed to an emitter input configuration for the embodiment in Figure 3. Aside from requiring the reversal in polarity of the polarizing source 98, the circuit of Figure 3 may be considered substantially the same in form and operation as that of Figure 2. For purposes of convenience, like circuit elements in Figures 2 and 3 have been given corresponding numerical designations.

Figure 4:
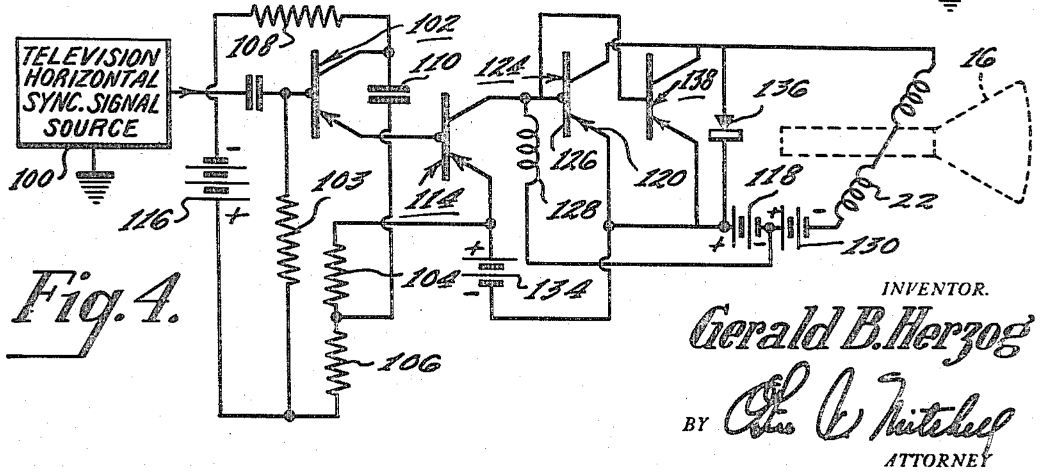
Fig. 4 is a combination block and schematic representation of a cathode ray beam deflection circuit embodying the present invention, and which is eminently suited for television receiver horizontal deflection use.

The embodiment of the invention shown in Figure 4 differs somewhat from that shown in Figures 1, 2 and 3. Here a deflection circuit, suitable for excitation of the horizontal deflection windings of a television deflection yoke, is illustrated. As is well known in the art, due to the higher operating frequencies in the horizontal deflection system, the horizontal deflection yoke winding presents considerable inductive reactance. This requires special precautions due to the high potentials developed during retrace intervals of the deflection cycles.

In Figure 4 a source of television horizontal synchronizing signal is shown at 100. This may be considered as forming a part of the block element 20 shown in Figure 1. The relaxation oscillator embodying the transistor 102 can be seen to be identical to that shown in Figures 2 and 3. Resistor 103 of Figure 4 corresponds to resistor 76 in Figure 2. Resistors 104 and 106 of Figure 4 correspond to resistors 72 and 74 in Figure 2. The charging resistor 108 in Figure 4 may be eliminated in some instances where the value of resistor 106 is made sufficiently large. Due to the higher deflection frequencies involved the value of charging capacitor 110 in Figure 4 will generally be made smaller than the charging capacitor 92 of Figure 2, when the arrangement of Figure 2 is used in vertical deflection circuit operation. In the arrangement of Figure 4, however, a transistor 114 is employed having its base emitter path connected in series with the discharge path of the capacitor 110, instead of the charge path of the capacitor as discussed in connection with Figures 2 and 3. Under these conditions, the emitter base current of the transistor 114 will be pulselike in nature corresponding to the rapid discharge of the capacitor 110 through the emitter collector path of transistor 102. During the linear charging of capacitor 110 from the power supply source 116 in Figure 4, the transistor 114 will be effectively reverse biased to express a substantially open emitter collector path. The bias source 118 in Figure 4 is connected between the emitter electrode 120 of transistor 124 and the base electrode 126 thereof through decoupling inductance 128. Transistor 138 is connected in parallel with transistor 124 to increase the power handling capabilities of the circuit over that which transistor 124 alone could provide.

Since the collector of the transistor 124 is connected through the horizontal deflection winding 22 of the deflection yoke to a source of negative bias potential 130, it will be seen that the transistor 124 will be established in a heavily conducting condition. Due to the inductive nature of the deflection coil 22, current therethrough will commence building up upon establishment of conduction in the transistor 124. This buildup of current in its early stages will be substantially linear as is well known in the art. Transistor 124 will remain heavily conducting until the relaxation oscillator transistor 102 discharges the capacitor 110 through the emitter base path of otherwise nonconducting transistor 114.

Upon establishment of emitter base conduction in transistor 114, the positive voltage of the polarizing source 134 will in effect be applied directly between the base and emitter of transistor 124. This corresponds to a reverse emitter base bias on the transistor 124 which will effectuate cutoff of collector current flow. The reactance of the inductor 128 permits this momentary change in the emitter base potential of transistor 124 while forming a low impedance direct current path of the static biasing of the transistor 124. As in conventional horizontal deflection circuits, interruption of current through the horizontal deflection coil 22 causes the polarity of voltage appearing across the winding 22 to reverse in a resonant ringing action, determined by the resonant frequency of the inductance value of coil 22 with stray circuit capacitance. The diode 136 statically polarized to be nonconducting, will then conduct to provide a reaction scanning current through the coil 22 in a well known fashion, as described in an article entitled "Magnetic Deflection Circuits for Cathode Ray Tubes" by O. H. Schade, appearing in the RCA Review for September 1947. After discharge of the capacitor 110, transistor 114 will be again rendered nonconducting and charging current for the inductance of winding 22 may again be established through the emitter base path of the transistor 124. It may thus be considered that the transistor 124 acts as a particular form of coupling or signal transducing means between the transistor 114 and the deflection winding 22. In the embodiment of Figure 2 it was, of course, possible to use direct wire coupling between the transistor 80 and the winding 26 as described hereinbefore.

It will be understood that the present invention as embodied in the arrangement of Fig. 4 is in no way limited to the use of two parallel transistors in shunt with the deflection coil. For example, if less output power is required the transistor 138 may be omitted while if greater output power is required additional transistors may be connected in parallel with both transistors 124 and 138.

In the novel circuitry of Figure 4, it is seen that a considerable reduction in power handling requirements of the semiconductor signal transducing devices and transistors connected with the deflection yoke is effectuated. Due to the low impedance of these transducers which are merely switched on and off in response to sawtooth capacitor discharge current flow through the emitter base path of a control transistor deflection winding "charging" power demands on the transistors are minimized. Reactive energy stored in the inductance of winding 22 is of course dissipated almost entirely through the diode 136 and inherent circuit resistance, including resistance of the coil 22. By such techniques deflection circuit action suitable for horizontal deflection service in 17 inch television receivers may be obtained with less than one third the required power handling capabilities of the semiconductor signal transducing device, as compared to the requirements of deflection circuits embodying conventional deflection signal amplifier techniques.

It will be understood that although in the above illustrated embodiments of the present invention a relaxation ocsillator type of sawtooth generating circuit has been shown, the successful practice of the present invention is in no way limited thereto. The concept of conducting charging and discharging current from a sawtooth waveform forming capacitor through the control path of a semiconductor signal transducing device whereby to effectuate efficient and linear drive of a cathode ray beam deflection means is obviously independent of the device used to charge and discharge the sawtooth charging capacitor.

Moreover, although the embodiments of the invention shown in Figures 1, 2 and 3 have included the placement of a semiconductor transducer control path in series with the charging circuit of a sawtooth capacitor for vertical deflection circuit use, it is evident from the understanding of Figure 4 that the control path of such a signal transducer could, in some instances, be placed in the discharge path of the sawtooth capacitor to provide suitable driving of horizontal deflection coils.

What is claimed is:

1. In a cathode ray beam deflection system, the combination of: a source of charging potential; a capacitor and impedance means connected in series with one another to form a combination which is in turn connected in charging relation to said source of charging potential; means connected with said capacitor for conditionally discharging said capacitor whereby to conditionally cause discharge current flow from said capacitor followed by a charging current flow from said potential source to said capacitor; a semiconductor signal transducing device having connection terminals defining an input current path and an output current path; means connected with said connection terminals and said capacitor impedance combination to place said input circuit path in series with said capacitor for controlling said semiconductor device in accordance with capacitor current flow; and cathode ray beam deflection means coupled with said semiconductor transducing device connection terminals for control by said semiconductor device as a function of output path current therein resulting from capacitor current flow in said semiconductor transducing device current path.

2. A cathode ray beam deflection circuit, according to claim 1, wherein means are provided for circuitly orienting said semiconductor transducing device input circuit path relative to said capacitor so as to be responsive to substantially only said capacitor discharge current flow.

3. A cathode ray beam deflection circuit according to claim 1, wherein means are provided for circuitly orienting said semiconductor transducing device input circuit path so as to be responsive only to capacitor charging current flow.

4. A cathode ray beam deflection circuit, according to claim 1, wherein said cathode ray beam deflection means comprises a winding of an electromagnetic deflection yoke; means for placing said electromagnetic deflection yoke winding across a current producing potential; a semiconductor power transducing device having input circuit path terminal means and output circuit path terminal means; connections placing said power transducing device output circuit path terminal means in series with said yoke winding such as to control current through said yoke in accordance with the effective resistance of said output circuit path; and wherein the coupling between said cathode ray beam deflection means with said first mentioned semiconductor signal transducing device comprises the coupliing of said first mentioned signal transducing device output circuit path with the input circuit path of said power transducing device.

5. A current control system for controlling the current through an inductive coil winding, comprising in combination: a semiconductor signal transducing device having terminals corresponding to at least a base, an emitter and a collector electrode; an inductive coil and power supply potential source connected in series combination with one another to form a combination; inductive reactance means connected between said base and one extremity of said combination; a connection between the other extremity of said combination and said collector electrode, the polarity of such potential source being such to apply a reverse bias to said collector electrode to permit a current build up through said inductor coil; forward bias means connected between said emitter and the junction of said inductive reactance means with said combination; means for controllably establishing a substantially direct connection between said base and said emitter of sufficiently low impedance to conditionally shunt out the forward biasing effects of said forward biasing means so as to decrease any current build up in said inductor coil; and damping means connected between the collector and emitter of said transducing device.

6. A current control system according to claim 5, wherein said damping means comprises a unidirectional conduction means polarized to establish damping of said inductor coil by a current flow opposite to that of said current build up.

7. A current control system according to claim 5, wherein said means for controllably establishing a substantially direct connection between said base and said emitter is supplemented by the serial connection therewith of reverse biasing means for said emitter of a value sufficient to ensure collector current cutoff upon actuation of said direct connection means.

8. In an electron beam deflection system, the combination of: a deflection coil; a source of deflection signal; a first semiconductor amplifier having an input circuit and an output circuit, said deflection signal source being connected in driving relation to said input circuit; biasing means connected in said output circuit for establishing an output current flow; a second semiconductor amplifier having electrodes corresponding to a base, emitter and collector connected to form an input circuit and an output circuit, said input circuit including forward biasing means for said input circuit, and said output circuit including a reverse collector-base bias source means; connections placing said deflection coil in series with said output circuit; and impedance means connected in series with said second amplifier input circuit and said first amplifier output circuit, the polarity of said first amplifier output circuit biasing means and current flow and the value of said impedance means being such that peak output current in said first amplifier output circuit is adequate to effectively establish a net reverse bias in said second amplifier input circuit.

9. In an electron beam deflection system, the combination of: a deflection coil; a source of deflection signal; a first semiconductor amplifier having an input circuit and an output circuit, said deflection signal source being connected in driving relation to said input circuit; biasing means connected in said output circuit for establishing an output current flow; a second semiconductor amplifier having electrodes corresponding to a base, emitter and collector connected to form an input circuit and an output circuit, said input circuit including forward biasing means for said input circuit, and said output circuit including a reverse collector-base bias source means; connections placing said deflection coil in series with said output circuit; and unidirectional current flow damping means connected across said deflection coil polarized to conduct current in a direction opposite to that of the current flow in said second amplifier output circuit.

10. In a television cathode ray beam deflection system, the combination of: a source of deflection timing signal current; a first semiconductor amplifier having a base, emitter and collector; an input circuit for said amplifier connected between said base and emitter, said input circuit including a reverse biasing potential means in series relation to said source of timing signal; a second semiconductor amplifier having a base, emitter and collector; a direct current connection from said first amplifier collector to said second amplifier base; reverse biasing means for said second amplifier emitter connected between said first amplifier emitter and said second amplifier emitter; forward biasing means for said second amplifier emitter in series with an inductor connected between said second amplifier emitter and said second amplifier base, with said inductor being connected immediately adjacent said base; reverse biasing means for said second amplifier collector and the junction of said inductor with said second amplifier emitter forward biasing means; a cathode ray beam deflection coil connected in series with the circuit path defined by said second amplifier collector and said reverse biasing means for said collector; and a diode connected between said second amplifier emitter and collector.

11. In a cathode ray beam deflection circuit, the combination of: a capacitor relaxation oscillator circuit comprising a capacitor which is periodically charged and discharged; a semi-conductor amplifier device having an input circuit and an output circuit; means connecting said input circuit with said capacitor for response to charge changes on said capacitor; and a cathode ray beam deflection coil and a direct current coupling means connected between said output circuit and said deflection coil.

References Cited in the file of this patent

UNITED STATES PATENTS

| | | |
|---|---|---|
| 2,361,998 | Fleming-Williams | Nov. 7, 1944 |
| 2,527,652 | Pierce | Oct. 31, 1950 |
| 2,659,022 | Oestreicher | Nov. 10, 1953 |